United States Patent
Urabe (10) Patent No.: US 9,832,419 B2
(45) Date of Patent: Nov. 28, 2017

(54) DISPLAY APPARATUS, CONTROL METHOD, AND NON-TRANSITORY COMPUTER-READABLE MEDIUM IN WHICH AN IMAGE-QUALITY ADJUSTING PARAMETER SET FOR RECEIVED IMAGE DATA IS RECORDED IN A STORAGE

(71) Applicant: CANON KABUSHIKI KAISHA, Tokyo (JP)

(72) Inventor: Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/964,828

(22) Filed: Dec. 10, 2015

(65) Prior Publication Data

US 2016/0182815 A1 Jun. 23, 2016

(30) Foreign Application Priority Data

Dec. 18, 2014 (JP) ................. 2014-255979
Oct. 21, 2015 (JP) ................. 2015-206908

(51) Int. Cl.
*H04N 5/92* (2006.01)
*H04N 5/77* (2006.01)
*H04N 9/82* (2006.01)

(52) U.S. Cl.
CPC ............. *H04N 5/77* (2013.01); *H04N 9/8205* (2013.01)

(58) Field of Classification Search
CPC .. H04N 5/23216; H04N 5/23229; H04N 5/77; H04N 8/87; H04N 9/87; H04N 9/8205; H04N 5/765; H04N 13/0066; G11B 27/031

See application file for complete search history.

(56) References Cited

U.S. PATENT DOCUMENTS

| 8,310,603 | B2 | 11/2012 | Asayama et al. | |
| 2009/0015687 | A1* | 1/2009 | Shinkai | H04N 5/765 348/222.1 |
| 2009/0109344 | A1* | 4/2009 | Ollivier | H04N 9/68 348/708 |
| 2010/0158366 | A1* | 6/2010 | Brown | G11B 27/034 382/167 |

(Continued)

*Primary Examiner* — David Harvey
(74) *Attorney, Agent, or Firm* — Fitzpatrick, Cella, Harper & Scinto (57) ABSTRACT

A display apparatus connected to an external apparatus that executes a recording process for image data. A display panel displays an image based on received image data. A memory storing a program executed by the processor causes the display apparatus to set an image-quality adjusting parameter for the received image data, to execute an image-quality adjusting process on the received image data using the image-quality adjusting parameter set for the received image data, to detect a start of the recording process for the image data executed by the external apparatus, and to perform control in which, in response to the detection of the start of the recording process for the image data executed by the external apparatus, the image-quality adjusting parameter that has been set for the received image data is automatically recorded in a storage as an image-quality adjusting parameter corresponding to the data recorded by the external apparatus.

16 Claims, 6 Drawing Sheets

(56) References Cited

U.S. PATENT DOCUMENTS

| | | | |
|---|---|---|---|
| 2010/0329646 A1* | 12/2010 | Loeffler | G11B 27/034 386/300 |
| 2011/0085025 A1* | 4/2011 | Pace | H04N 9/8205 348/49 |
| 2012/0257078 A1* | 10/2012 | Toishita | G06F 3/04847 348/222.1 |
| 2014/0036105 A1* | 2/2014 | Iwaki | H04N 9/67 348/223.1 |
| 2014/0184825 A1* | 7/2014 | Kitajima | G11B 27/3027 348/207.1 |
| 2014/0286628 A1* | 9/2014 | Ando | H04N 9/793 386/282 |
| 2015/0222792 A1* | 8/2015 | Ogikubo | H04N 5/243 348/242 |

* cited by examiner

| SCENE | MOVING-IMAGE DATA | IMAGE-QUALITY ADJUSTING PARAMETER |
|---|---|---|
| SCENE 1 | scene1.dpx | scene1.cdl |
| SCENE 2 | scene2.dpx | scene2.cdl<br>scene2_00010000.cdl |

DISPLAY APPARATUS, CONTROL METHOD, AND NON-TRANSITORY COMPUTER-READABLE MEDIUM IN WHICH AN IMAGE-QUALITY ADJUSTING PARAMETER SET FOR RECEIVED IMAGE DATA IS RECORDED IN A STORAGE

CLAIM OF PRIORITY

This application claims the benefit of Japanese Patent Application No. 2014-255979, filed on Dec. 18, 2014, and of Japanese Patent Application No. 2015-206908, filed on Oct. 21, 2015, which are hereby incorporated by reference herein in their entirety.

BACKGROUND OF THE INVENTION

Field of the Invention

The present invention relates to a parameter-recording control apparatus and a control method for the parameter-recording control apparatus.

Description of the Related Art

In general, steps of producing image content, such as movie content or broadcasting content, include an image-capturing step of generating image data (captured-image data) by image capturing and an editing step of editing the captured-image data. In recent years, the number of cases is increasing in which an image-quality adjusting process (color adjusting process, color grading, or the like) using captured-image data is carried out at an image-capturing site (the site where the image-capturing step is carried out) so as to pre-check whether the desired image capturing is performed.

According to the prior art, the image-quality adjusting process at the image-capturing site (simplified image-quality adjusting process) is executed using a personal computer (PC). In recent years, however, a display apparatus with an image-quality adjusting function for the image-quality adjusting process has been used to display the captured-image data without using an apparatus such as a PC, allowing for the image-quality adjusting process using the captured-image data.

Image-quality adjusting parameters used for the image-quality adjusting process at the image-capturing site are recorded in a storage unit and used for an image-quality adjusting process during an editing step (detailed image-quality adjusting process), and the like.

According to the prior art, however, the image-quality adjusting parameter needs to be manually recorded in a storage unit. Furthermore, according to the prior art, in a case of reproducing the captured-image data, the image-quality adjusting parameter needs to be manually read from the storage unit and set in an image-quality adjusting unit (a functional unit that executes the image-quality adjusting process). In general, the image-quality adjusting parameter varies with each scene in the image content. Consequently, recording, reading, setting, and the like, of the image-quality adjusting parameter need, according to the prior art, to be performed on each scene. Thus, the technique according to the prior art requires complicated user operations involving the recording, reading, setting, and the like, of the image-quality adjusting parameter, imposing a heavy burden on users. Furthermore, difficult and burdensome work (user work) is required in the prior art, which involves selecting, at the time of reproduction of the captured-image data, one of an enormous number of image-quality adjusting parameters that corresponds to a scene to be reproduced.

Additionally, an appropriate method for managing the image-quality adjusting parameter depends on the details of the work. For example, the work of checking captured-image data using a display apparatus, without recording the data, does not require the user operation involving the recording, reading, setting, and the like, of an image-quality adjusting parameter. The work of recording the captured-image data requires a user operation of recording the image-quality adjusting parameter in order to allow the image-quality adjusting parameter used for this work to be used in a post-process. The work of reproducing and checking the recorded captured-image data requires a user operation of reading and setting the image-quality adjusting parameter in order to allow an image-quality adjusting process executed in a pre-process to be reproduced. Furthermore, if a user operation of changing the set image-quality adjusting parameter is performed during the work of reproducing and checking the recorded captured-image data, a user operation of recording the changed image-quality adjusting parameter is required. Thus, according to the prior art, a user needs to determine and to perform appropriate user operations according to the details of the work.

An example of techniques used in the prior art to reduce the burden on the user is disclosed in published WIPO document number WO 2007/072791. The technique disclosed in WO 2007/072791 involves acquiring the genre of a program to be reproduced and controlling the operations of a television and an amplifier in accordance with the sound-output mode corresponding to the acquired genre. However, the technique disclosed in WO 2007/072791 is a technique for omitting a user operation of switching between sound output devices, and is not a technique related to a method of managing the image-quality adjusting parameter. Thus, even the use of the technique disclosed in WO 2007/072791 fails to reduce the above-described burden involved in the appropriate management (recording and setting) of the image-quality adjusting parameter.

SUMMARY OF THE INVENTION

The present invention provides a technique that reduces a burden on a user and that allows an image-quality adjusting parameter to be appropriately managed (recorded and set).

The present invention, in its first aspect, provides a parameter-recording control apparatus connected directly or indirectly to an external apparatus that executes a recording process for image data, the parameter-recording control apparatus comprising an input unit configured to receive the image data, an image-quality adjuster configured to execute an image-quality adjusting process on the received image data using a set image-quality adjusting parameter, a detector configured to detect a start of the recording process for the image data executed by the external apparatus, and a recording controller configured to perform control in which, in response to the detection of the start of the recording process for the image data executed by the external apparatus, the image-quality adjusting parameter set for the image-quality adjuster is automatically recorded in a storage as an image-quality adjusting parameter corresponding to the image data recorded by the external apparatus.

The present invention, in its second aspect, provides a control method for a parameter-recording control apparatus connected directly or indirectly to an external apparatus that executes a recording process for image data, the control method comprising receiving the image data, executing an image-quality adjusting process on the received image data using a set image-quality adjusting parameter, detecting a start of the recording process for the image data executed by the external apparatus, and performing control in which, in response to the detection of the start of the recording process for the image data executed by the external apparatus, the image-quality adjusting parameter set for the image-quality adjuster is automatically recorded in a storage as an image-quality adjusting parameter corresponding to the image data recorded by the external apparatus.

The present invention, in its third aspect, provides a non-transitory computer readable medium that stores a program, wherein the program causes a computer to execute a control method for a parameter-recording control apparatus connected directly or indirectly to an external apparatus that executes a recording process for image data, and the control method includes receiving the image data, executing an image-quality adjusting process on the received image data using a set image-quality adjusting parameter, detecting a start of the recording process for the image data executed by the external apparatus, and performing control in which, in response to the detection of the start of the recording process for the image data executed by the external apparatus, the image-quality adjusting parameter set for the image-quality adjuster is automatically recorded in a storage as an image-quality adjusting parameter corresponding to the image data recorded by the external apparatus.

The present invention reduces a burden on a user and allows the image-quality adjusting parameter to be appropriately managed (recorded and set).

Further features of the present invention will become apparent from the following description of exemplary embodiments with reference to the attached drawings.

DESCRIPTION OF THE EMBODIMENTS

Embodiment 1

A parameter-recording control apparatus and a control method for the parameter-recording control apparatus according to Embodiment 1 of the present invention will be described below. In the present embodiment, a case will be described in which the parameter-recording control apparatus according to the present embodiment is provided in a display apparatus. However, the parameter-recording control apparatus according to the present embodiment may be an apparatus separate from the display apparatus.

Figure 1A:
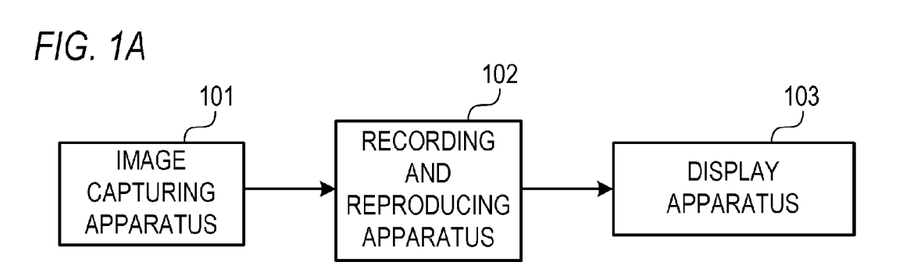
FIGS. 1A to 1C are block diagrams depicting an example of a configuration of an image-editing system according to Embodiment 1.

FIG. 1A is a block diagram depicting an example of a configuration of an image-editing system according to the present embodiment. As depicted in FIG. 1A, the image-editing system according to the present embodiment has an image capturing apparatus 101, a recording and reproducing apparatus 102, and a display apparatus 103. The image capturing apparatus 101 and the recording and reproducing apparatus 102 are directly connected together using a Serial Digital Interface (SDI) cable. The recording and reproducing apparatus 102 and the display apparatus 103 are also directly connected together using an SDI cable. The image capturing apparatus 101 and the recording and reproducing apparatus 102 are external apparatuses for the display apparatus 103.

The SDI cables are not the only options for the cable connecting the image capturing apparatus 101 and the recording and reproducing apparatus 102 together, and the cable connecting the recording and reproducing apparatus 102 and the display apparatus 103 together. Any cables may be used, as long as image data, sound data, control data, and the like, can be transmitted through the cables. For example, High Definition Multimedia Interface (HDMI) cables may be used, through which control data can be transmitted in a bidirectional manner. In this case, image data and sound data are transmitted through a Transition Minimized Differential Signaling (TMDS) line specified in the HDMI standards. Control data is transmitted through a Consumer Electronics Control (CEC) line or a Display Data Channel (DDC) line specified in the HDMI standards. The cable connecting the image capturing apparatus 101 and the recording and reproducing apparatus 102 may be different from the cable connecting the recording and reproducing apparatus 102 and the display apparatus 103 together. The image capturing apparatus 101 and the recording and reproducing apparatus 102 may be wirelessly connected together, and the recording and reproducing apparatus 102 and the display apparatus 103 may be wirelessly connected together.

In the present embodiment, a case when the image data is moving-image data will be described. However, the image data may be still-image data.

The image capturing apparatus 101 generates image data (captured-image data) by image capturing, and outputs the generated image data. For example, various digital cameras may be used as the image capturing apparatus 101.

The recording and reproducing apparatus 102 acquires image data output by the image capturing apparatus 101, and outputs the image data and control data. The recording and reproducing apparatus 102 has a recording unit and can execute a recording process for image data acquired from the image capturing apparatus 101 in a storage unit, a reproducing process for the image data recorded by the recording process, and the like. In a case when the image data is moving-image data, the reproducing process allows frames of the moving-image data recorded in the storage unit to be sequentially reproduced. The recording and reproducing apparatus 102 directly outputs the image data acquired from the image capturing apparatus 101 or outputs the image data reproduced by the reproducing process. In the present embodiment, the control data includes state information indicative of the operating state of the recording and reproducing apparatus 102. In the present embodiment, the state information includes first state information on the recording process and second state information on the reproducing process, and a pausing process. For example, the state information indicates whether or not the recording process is being executed, the reproducing process is being executed, the pausing process is being executed, and the like. The pausing process is a process of not updating a frame to be reproduced (the frame on which the reproducing process is to be executed). In the present embodiment, the control data includes the data name of the image data to be recorded or reproduced and a time code for the frame to be recorded or reproduced. The time code is temporal-position information indicative of the temporal position of the frame in the moving-image data. Various recorders may be used as the recording and reproducing apparatus 102.

Instead of the recording and reproducing apparatus 102 that executes the recording process, the reproducing process, and the pausing process, an image-recording apparatus executing the recording process and an image-reproducing apparatus executing the reproducing process and the pausing process may be used. In a case when the image-recording apparatus and the image-reproducing apparatus are used, the first state information is "information indicative of the operating state of the image-recording apparatus", and the second state information is "information indicative of the operating state of the image-reproducing apparatus".

The display apparatus 103 acquires the image data and the control data output from the recording and reproducing apparatus 102. Then, the display apparatus 103 executes predetermined image processing on the acquired image data, and displays an image based on the image data with the predetermined image processing executed thereon. The predetermined image processing includes an image-quality adjusting process of adjusting the image quality (color, brightness, and the like) of image data using an image-quality adjusting parameter set for the display apparatus 103. As the predetermined image processing, the image-quality adjusting process may be exclusively executed or a plurality of types of image processing, including the image-quality adjusting process, may be executed. As the display apparatus 103, a liquid-crystal display apparatus, an organic electroluminescent (EL) display apparatus, a plasma display apparatus, or the like, may be used.

For a method of managing colors in images, an ASC CDL (The American Society of Cinematographers Color Decision List) has been proposed by the American Society of Cinematographers. The ASC CDL is hereafter simply referred to as the "CDL". The type of the image-quality adjusting parameter used in the present embodiment is not particularly limited. As the image-quality adjusting parameter, for example, an image-quality adjusting parameter of the type defined by the CDL, however, may be used.

The CDL defines SLOPE, OFFSET, POWER, and SATURATION as the types of the image-quality adjusting parameters. The SLOPE image-quality adjusting parameter is a gain value by which each gradation value for the image data is multiplied. An OFFSET image-quality adjusting parameter is an offset value added to or subtracted from each gradation value in the image data. The POWER image-quality adjusting parameter is a gamma value for a gamma converting process executed on the image data. The SATURATION image-quality adjusting parameter is a chroma gain value by which each chroma value for the image data is multiplied.

The use of the image-quality adjusting parameter of any of the types defined in the CDL allows image display colors (colors on a screen) to be matched among a plurality of display apparatuses by setting the image-quality adjusting parameter set during color editing using one display apparatus, for another apparatus.

Figure 2A:
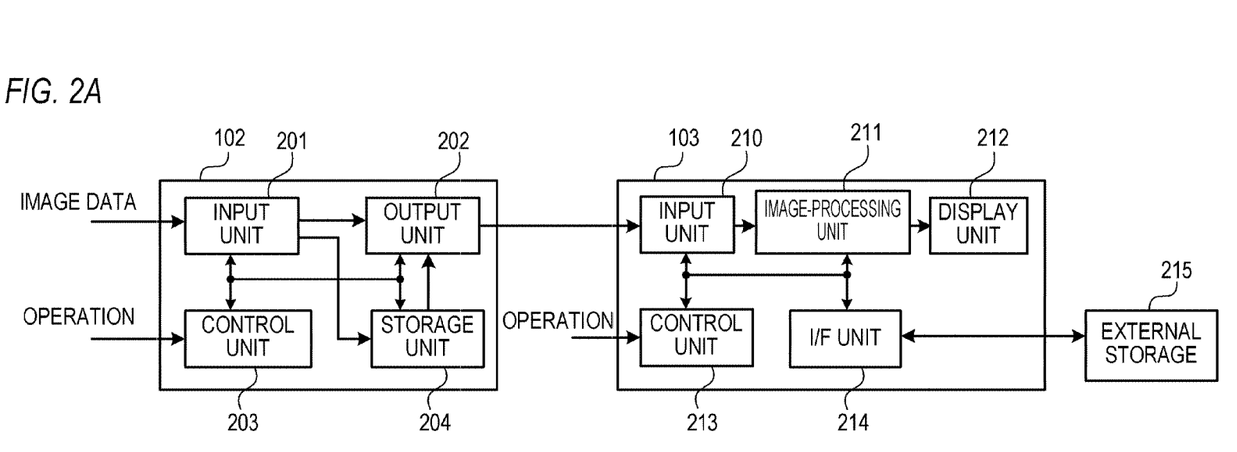
FIGS. 2A and 2B are block diagrams depicting an example of configurations of a recording and reproducing apparatus and a display apparatus according to Embodiment 1.

FIG. 2A is a block diagram depicting an example of configurations of the recording and reproducing apparatus 102 and the display apparatus 103. As depicted in FIG. 2A, the recording and reproducing apparatus 102 has an input unit 201, an output unit 202, a control unit 203, and a storage unit 204. The display apparatus 103 has an input unit 210, an image-processing unit 211, a display unit 212, a control unit 213, and an I/F unit 214.

First, the configuration of the recording and reproducing apparatus 102 will be described.

The input unit 201 acquires image data from the image capturing apparatus 101.

The output unit 202 outputs the image data and the control data to the display apparatus 103.

The storage unit 204 is a first storage apparatus that stores the image data acquired from the image capturing apparatus 101. As the first storage apparatus, an optical disc, a magnetic disk, a semiconductor memory, or the like, may be used. The first storage apparatus may be a storage apparatus that can be installed in and removed from the recording and reproducing apparatus 102, or a storage apparatus that is non-removable from the recording and reproducing apparatus 102.

The control unit 203 generates control data or controls an operation of any functional unit of the recording and reproducing apparatus 102 in accordance with a user operation performed on the recording and reproducing apparatus 102.

In a case when a user operation indicating execution of the recording process is performed on the recording and reproducing apparatus 102, control data is generated that includes state information indicating that the recording process is being performed, the data name of image data to be recorded, and the time code for a frame to be recorded. The image data acquired by the input unit 201 is recorded in the storage unit 204. The image data acquired by the input unit 201 and the control data are output from the output unit 202. Thus, while the recording process is being executed, the image-quality adjusting process is executed on the image data to be recorded (recorded image data), with the resultant data displayed, and the recorded image data on which the image-quality adjusting process has not been executed yet is recorded.

In a case when a user operation indicating execution of the reproducing process is performed on the recording and reproducing apparatus 102, control data is generated that includes state information indicating that the reproducing process is being performed, the data name of image data to be reproduced, and the time code for a frame to be reproduced. The image data to be reproduced is read from the storage unit 204 onto the output unit 202. The image data read from the storage unit 204 and the control data are output from the output unit 202. Thus, while the reproducing process is being executed, the image-quality adjusting process is executed on the image data to be reproduced (reproduced image data), with the resultant data displayed.

During a period when neither the recording process nor the reproducing process is executed, the image data acquired by the input unit 201 is output from the output unit 202.

Now, a configuration of the display apparatus 103 will be described.

The input unit 210 acquires the image data and the control data from the recording and reproducing apparatus 102. The input unit 210 outputs the acquired image data to the image-processing unit 211, and outputs the acquired control data to the control unit 213. If the recording process is being executed, the image data to be recorded is acquired. If the reproducing process is being executed, the image data to be reproduced (image data for a frame to be reproduced) is acquired.

The process of acquiring the image data and the process of acquiring the control data may be implemented by different functional units. In a case when the piece of the first state information and the piece of the second state information are individually acquired, a process of acquiring the first state information (first acquiring process) and a process of acquiring the second state information (second acquiring process) may be implemented by different functional units.

The image-processing unit 211 executes predetermined image processing on the image data output from the input unit 210. In the present embodiment, an image-quality adjusting process using an image-quality adjusting parameter set for the image-processing unit 211 is executed on the image data output from the input unit 210. The image-processing unit 211 outputs the image data with the image-quality adjusting process executed thereon to the display unit 212. In a case when executing only the image-quality adjusting process, the image-processing unit 211 may be referred to as the "image-quality adjusting unit".

The display unit 212 displays an image based on the image data output from the image-processing unit 211 (the image data with the image-quality adjusting process executed thereon). As the display unit 212, a liquid-crystal display apparatus, an organic EL display apparatus, a plasma display apparatus, or the like, may be used.

The I/F unit 214 is used to communicate with an external storage 215. In the present embodiment, the I/F unit 214 is used to record the image-quality adjusting parameter in the external storage 215 and to read the image-quality adjusting parameter from the external storage 215.

The external storage 215 is a second storage apparatus that can store the image-quality adjusting parameter. As the second storage apparatus, an optical disc, a magnetic disk, a semiconductor memory, or the like, may be used. In the present embodiment, a Universal Serial Bus (USB) memory that can be installed in and removed from the display apparatus 103 is used as the external storage 215. The second storage apparatus may be a storage apparatus that can be installed in and removed from the display apparatus 103, or a storage apparatus that is non-removable from the display apparatus 103. Alternatively, one storage apparatus that serves both as the first storage apparatus and as the second storage apparatus may be used.

The control unit 213 executes a parameter setting process, a detection process, a parameter recording process, and the like, based on the control data output from the input unit 210, the user operation performed on the display apparatus 103, and the like. The parameter setting process is a process of setting the image-quality adjusting parameter for the image-processing unit 211. For example, the parameter setting process involves setting the image-quality adjusting parameter in accordance with the user operation, reading the image-quality adjusting parameter from the external storage 215 and setting the image-quality adjusting parameter, and changing the set image-quality adjusting parameter in accordance with the user operation. The detection process is a process of detecting the start of the recording process, the start of the reproducing process, and the like. In the present embodiment, the operating state of the recording and reproducing apparatus 102 is determined based on the state information included in the control data. The state information included in the control data is monitored to detect the start of the recording process, the start of the reproducing process, and the like. The parameter recording process is a process of recording the image-quality adjusting parameter in the externals storage 215. At least one of the parameter setting process, the detection process, and the parameter recording process is executed by a functional unit different from the control unit 213.

The parameter-recording control apparatus according to the present embodiment may have a configuration that enables at least the detection process and the parameter recording process to be executed. The display unit 212 and the image-processing unit 211 may be provided in an apparatus different from the parameter-recording control apparatus. The parameter setting process may be executed by an apparatus different from the parameter-recording control apparatus. The parameter-recording control apparatus according to the present embodiment may have the recording and reproducing apparatus 102, an image recording apparatus (image recording unit), an image reproducing apparatus (image reproducing unit), the first storage apparatus, and the second storage apparatus.

Figure 2B:
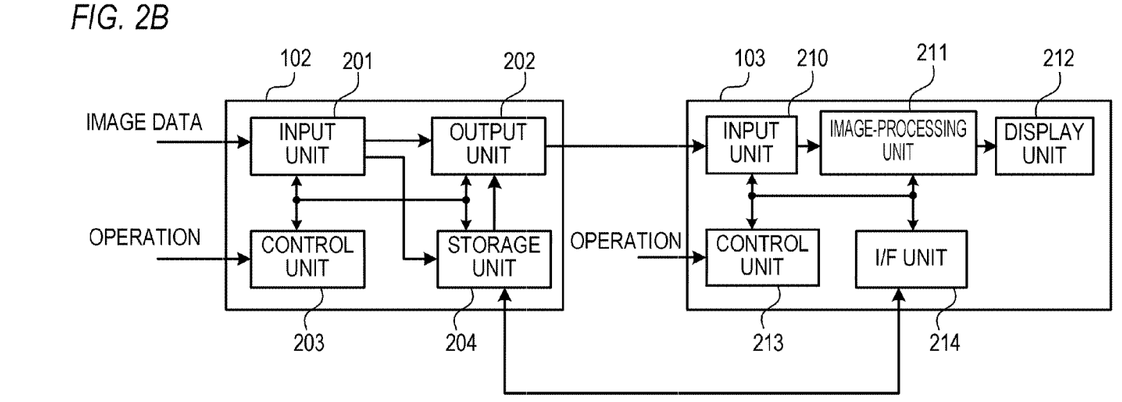

As depicted in FIG. 2B, instead of the external storage 215, the storage unit 204 of the image capturing apparatus 101 may be used. In this case, the I/F unit 214 is used for communication with the storage unit 204 of the image capturing apparatus 101 and to record the image-quality adjusting parameter in the storage unit 204 of the image capturing apparatus 101. The I/F unit 214 and the storage unit 204 of the image capturing apparatus 101 may be configured to communicate with each other wirelessly or via an HDMI cable, or the like.

Figure 3:
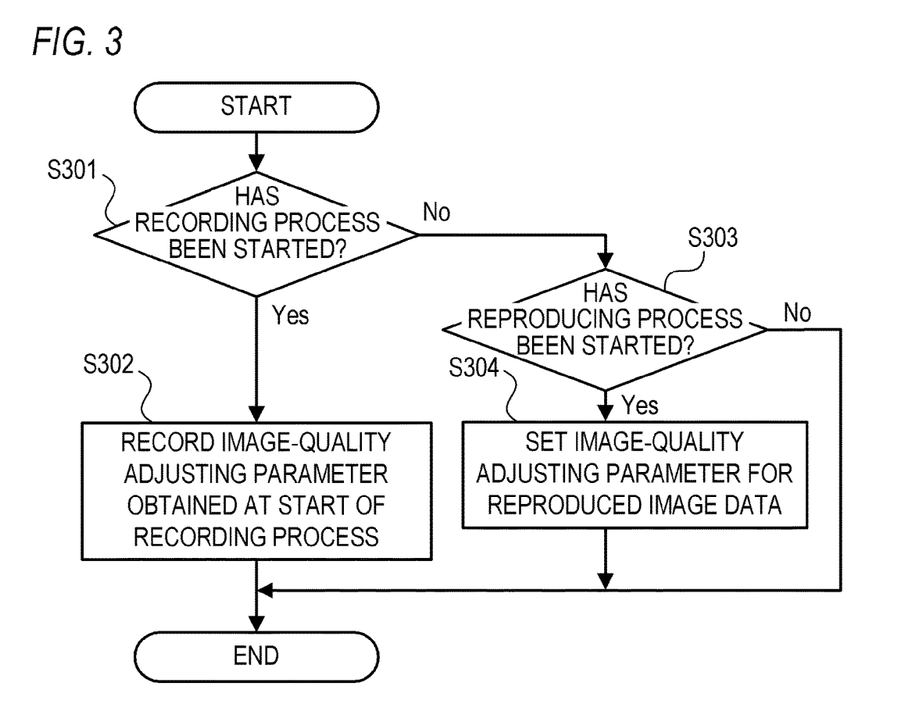
FIG. 3 is a flowchart illustrating an example of operations of the display apparatus according to Embodiment 1.

FIG. 3 is a flowchart depicting an example of operations of the display apparatus 103. The flowchart in FIG. 3 starts with detection, by the control unit 213, of a change in the operating state of the recording and reproducing apparatus 102 serving as a trigger. The change in the operating state of the recording and reproducing apparatus 102 can be detected by monitoring the state information.

First, in step S301, the control unit 213 determines whether or not the recording process has been started based on the state information (first state information) included in the control data acquired by the input unit 210. The present process allows the start of the recording process to be detected. Upon determining that the recording process has been started, the control unit 213 allows the process to proceed to step S302. Upon determining that the recording process has not been started, the control unit 213 allows the process to proceed to step S303.

In step S302, the control unit 213 automatically records the image-quality adjusting parameter set for the image-processing unit 211 at the start of the recording process, in the external storage 215, as the image-quality adjusting parameter corresponding to the target image data for the started recording process. In the present embodiment, the image-quality adjusting parameter set at the start of the recording process is recorded as the image-quality adjusting parameter corresponding to all the frames in the moving-image data to be recorded. For example, the control unit 213 records the image-quality adjusting parameter in the external storage 215 in association with corresponding information indicative of the image data corresponding to the image-quality adjusting parameter. As the corresponding information, information including the data name of the image data may be used. In a case when the corresponding information is described in at least one of a tag and a file name of a data file for the image-quality adjusting parameter, the corresponding information can be associated with the image-quality adjusting parameter. The corresponding information can also be associated with the image-quality adjusting parameter by being described in the tag and file name of the data file for the image-quality adjusting parameter in a divided manner. The method for the association is not particularly limited.

The timing for the process in step S302 is not particularly limited. For example, the process in step S302 may be executed at the start of or the end of the recording process, or during the recording process. In a case when the process in step S302 is executed at the start of the recording process, the start of the recording process may be detected. In a case when the process in step S302 is executed at the end of the recording process, the start and end of the recording process may be detected.

In step S303, the control unit 213 determines whether or not the reproducing process has been started, based on the state information (second state information) included in the control data acquired by the input unit 210. The present process allows the start of the reproducing process to be detected. Upon determining that the recording process has been started, the control unit 213 allows the process to proceed to step S304. Upon determining that the reproducing process has not been started, the control unit 213 ends the flowchart.

In step S304, the control unit 213 automatically reads, from the external storage 215, the image-quality adjusting parameter stored in the external storage 215 as the image-quality adjusting parameter corresponding to the target image data for the started reproducing process. The control unit 213 automatically sets the read image-quality adjusting parameter for the image-processing unit 211. The correspondence between the image-quality adjusting parameter and the image data can be checked by, for example, referencing the corresponding information associated with the image-quality adjusting parameter. The process in step S304 is preferably executed at the start of the reproducing process.

As illustrated in the flowchart shown in FIG. 3, in a case when the user simply performs an operation of indicating the execution (start) of the recording process, the image-quality adjusting parameter corresponding to the image data to be recorded is automatically recorded in the external storage 215. In a case when the user simply performs an operation of indicating the execution (start) of the reproducing process, the image-quality adjusting parameter corresponding to the image data to be reproduced is automatically read from the external storage 215 and automatically set for the image-processing unit 211. Thus, a burden on the user can be significantly reduced. During the reproducing process, the results of the past image-quality adjusting process can be easily reproduced.

The recording and reproducing apparatus 102 may be configured so as to automatically read, during the reproducing process, the image-quality adjusting parameter corresponding to the image data to be reproduced from the external storage 215 to automatically set the image-quality adjusting parameter for the image-processing unit (not depicted in the drawings) inside the recording and reproducing apparatus 102.

Figure 4:
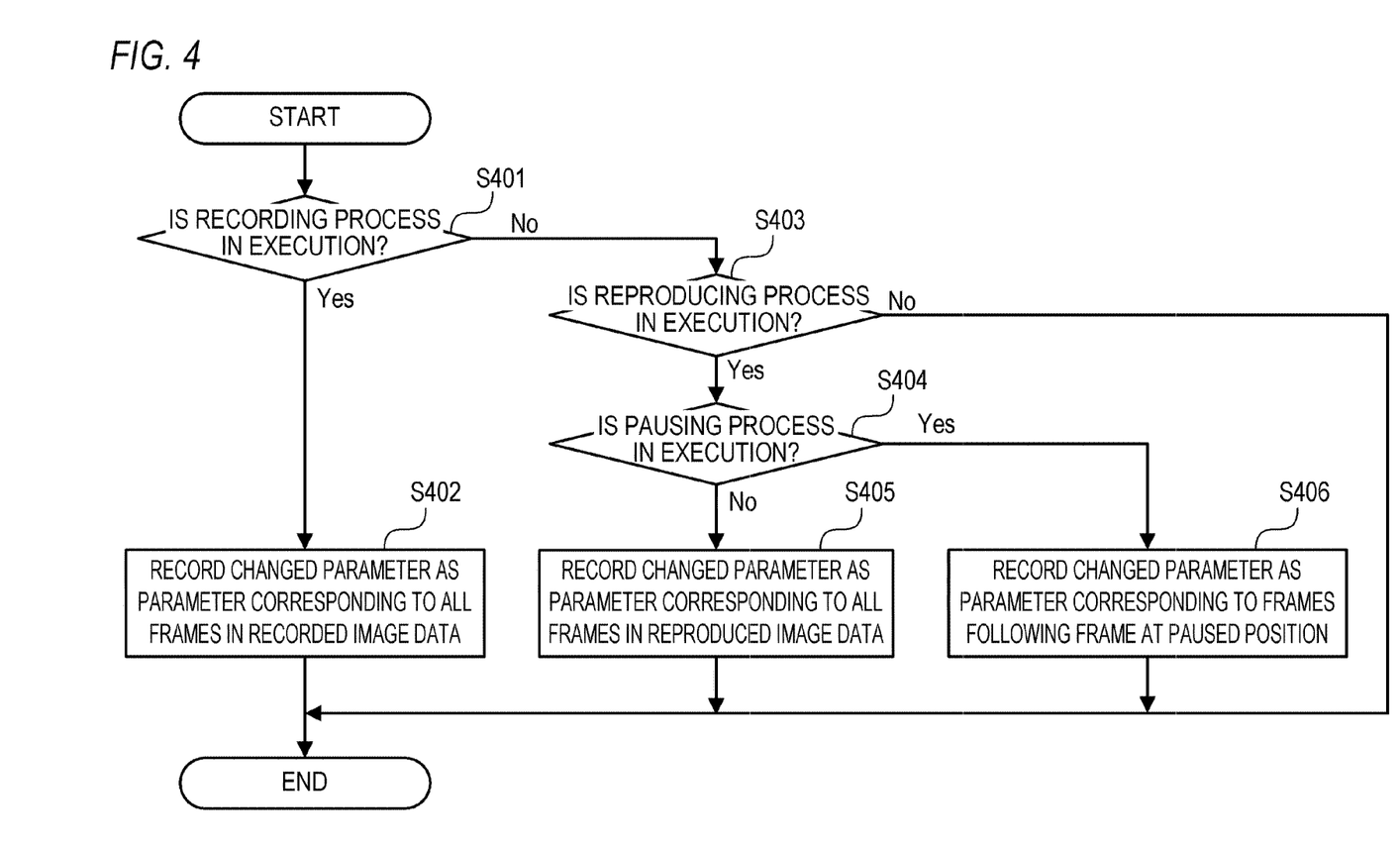
FIG. 4 is a flowchart illustrating an example of the operations of the display apparatus according to Embodiment 1.

FIG. 4 is a flowchart illustrating an example of an operation of the display apparatus 103 performed in a case when a user operation (parameter changing operation) is carried out to change the image-quality adjusting parameter set for the image-processing unit 211. The flowchart shown in FIG. 4 is started with the detection, by the control unit 213, of the parameter changing operation, serving as a trigger.

First, in step S401, the control unit 213 determines whether or not the recording process is in execution based on the state information (first state information) included in the control data acquired by the input unit 210. The present process allows detection of the parameter changing operation performed during the execution of the recording process. Upon determining that the recording process is in execution, the control unit 213 allows the process to proceed to step S402. Upon determining that the recording process is not in execution, the control unit 213 allows the process to proceed to step S403.

In step S402, the control unit 213 automatically records the image-quality adjusting parameter changed in accordance with the parameter changing operation, in the external storage 215, as the image-quality adjusting parameter corresponding to the target image data for the recording process in execution. In the present embodiment, the changed image-quality adjusting parameter is recorded as the image-quality adjusting parameter corresponding to all of the frames in the moving-image data to be recorded. As described above, in the present embodiment, in a case when the parameter changing operation performed during the execution of the recording process is detected, the image-quality adjusting parameter, changed in accordance with the parameter changing operation, is automatically recorded as the image-quality adjusting parameter corresponding to the moving-image data to be recorded.

In step S403, the control unit 213 determines whether or not the reproducing process is in execution based on the state information (second state information) included in the control data acquired by the input unit 210. The present process allows detection of the parameter changing operation performed during the execution of the reproducing process. Upon determining that the recording process is in execution, the control unit 213 allows the process to proceed to step S404. Upon determining that the reproducing process is not in execution, the control unit 213 ends the flowchart.

In step S404, the control unit 213 determines whether or not the pausing process is in execution based on the state information (second state information) included in the control data acquired by the input unit 210. The present process allows detection of the parameter changing operation performed during a non-paused reproduction period (first period) and the parameter changing operation performed during a paused reproduction period (second period). The non-paused reproduction period is a period when the reproducing process is in execution, but when the pausing process is not in execution. The paused reproduction period is a period when the reproducing process is in execution and when the pausing process is also in execution. Upon determining that the pausing process is not in execution, the control unit 213 allows the process to proceed to step S405. Upon determining that the pausing process is in execution, the control unit 213 allows the process to proceed to step S406.

In steps S405 and S406, the control unit 213 automatically records the image-quality adjusting parameter, changed in accordance with the parameter changing operation, in the external storage 215, as the image-quality adjusting parameter corresponding to the target image data for the reproducing process in execution. Thus, in the present embodiment, in a case when the parameter changing operation performed during the execution of the reproducing process is detected, the image-quality adjusting parameter, changed in accordance with the parameter changing operation, is automatically recorded as the image-quality adjusting parameter corresponding to the image data to be reproduced.

Specifically, in step S405, the image-quality adjusting parameter, changed in accordance with the parameter changing operation, is automatically recorded as the image-quality adjusting parameter corresponding to all the frames in the moving-image data to be reproduced. In the present embodiment, in a case when the parameter changing operation performed during the non-paused reproduction period is detected, the image-quality adjusting parameter, changed in accordance with the parameter changing operation, is automatically recorded as the image-quality adjusting parameter corresponding to all the frames in the moving-image data to be reproduced.

In step S406, the image-quality adjusting parameter, changed in accordance with the parameter changing operation, is recorded as an image-quality adjusting parameter corresponding, among frames in the moving-image data to be reproduced, to the frames that follow the frame to be reproduced. Thus, in the present embodiment, in a case when the parameter changing operation performed during the execution of the paused reproduction period is detected, the image-quality adjusting parameter, changed in accordance with the parameter changing operation, is automatically recorded as the image-quality adjusting parameter corresponding to the frames following the frame to be reproduced. In step S406, for example, the image-quality adjusting parameter corresponding to a certain part of the frames in the moving-image data is associated with the corresponding information indicative of the certain part of the frames, with the resultant image-quality adjusting parameter recorded in the external storage 215. As the corresponding information, information including the data name of the moving-image data, and time codes for the certain part of the frames, may be used.

As illustrated in the flowchart in FIG. 4, in a case when the user simply performs the parameter changing operation during the execution of the recording process, the changed image-quality adjusting parameter is automatically recorded as the image-quality adjusting parameter corresponding to the image data to be recorded. In a case when a user simply performs the parameter changing operation during the execution of the reproducing process, the changed image-quality adjusting parameter is automatically recorded as the image-quality adjusting parameter corresponding to the image data to be reproduced. Thus, the burden on the user can be significantly reduced.

The process in step S402 may be a process of updating the image-quality adjusting parameter recorded in the external storage 215 (overwrite saving) or a process of additionally recording a new image-quality adjusting parameter in the external storage 215. This also applies to the processes in steps S405 and S406. Performing the overwrite saving as the processes in steps S402, S405, and S406 eliminates the need for a user operation of selecting one of the plurality of image-quality adjusting parameters that is to be set for the image-processing unit 211. This enables a further reduction in the burden on the user.

Figure 5:
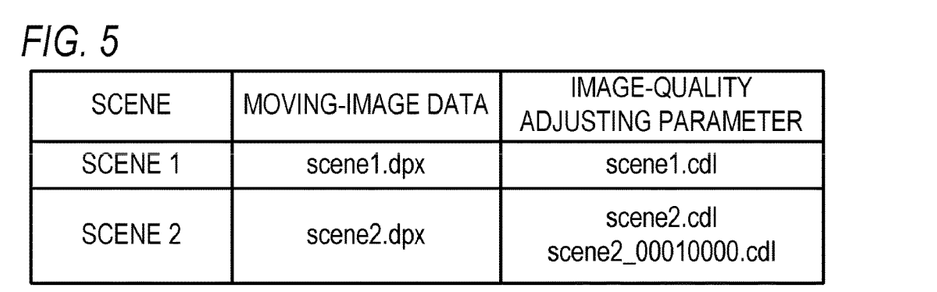
FIG. 5 is a diagram depicting an example of image data and an image-quality adjusting parameter according to Embodiment 1.

FIG. 5 is a diagram depicting an example of image data recorded in the storage unit 204 of the recording and reproducing apparatus 102, and the image-quality adjusting parameter recorded in the external storage 215. In the example shown in FIG. 5, in the storage unit 204, moving-image data with a data name "scene 1" is recorded as moving-image data on a scene (captured scene) 1 in image content to be created. Moving-image data with a data name "scene 2" is recorded as moving-image data on a scene 2. In the example in FIG. 5, "dpx" is used as an extension for the image data.

According to the present embodiment, the image-quality adjusting parameter corresponding to the image data can be automatically recorded in the external storage 215. In FIG. 5, a data file "scene1.cdl" is a data file of the image-quality adjusting parameter corresponding to the moving-image data on the scene 1. A data file "scene2.cdl" is a data file of the image-quality adjusting parameter corresponding to the moving-image data on the scene 2. The image-quality adjusting parameter can be associated with the image data by including the data name of the image data in the file name of the data file of the image-quality adjusting parameter, as described above.

According to the present embodiment, the image-quality adjusting parameter corresponding to a certain part of the frames in the moving-image data can be automatically recorded in the external storage 215. In FIG. 5, a data file "scene2_00010000.cdl" is a data file of the image-quality adjusting parameter corresponding to the frames following a frame with a time code "00:01:00.00" among frames in the moving-image data on the scene 2. The image-quality adjusting parameter can be associated with a certain part of the frames in the image data by including the data name of and the time code for the image data in the file name of the data file of the image-quality adjusting parameter, as described above.

According to the present embodiment, in a case when image data is reproduced and checked, the image-quality adjusting parameter corresponding to the image data can be automatically read from the external storage 215, and the read image-quality adjusting parameter can be automatically set for the image-processing unit 211. For example, in a case when the moving-image data on the scene 1 is reproduced and checked, the data file "scene1.cdl" can be automatically read and used. In a case when those of the frames in the moving-image data on the scene 2 that precede a frame with a time code "00:01:00.00" are reproduced and checked, a data file "scene2.cdl" can be automatically read and used. In a case when those of the frames in the moving-image data on the scene 2 that follow the frame with the time code "00:01:00.00" are reproduced and checked, the data file "scene2_00010000.cdl" can be automatically read and used.

As described above, according to the present embodiment, the image-quality adjusting parameter corresponding to the image data can be automatically appropriately managed (recorded and set) in accordance with the operating state of the recording and reproducing apparatus. Thus, the burden on the user can be reduced, and the image-quality adjusting parameter can be appropriately managed.

Not all of the processes described in the present embodiment need to be executed. At least one of the processes in steps S302, S304, S402, S405, and S406 may be executed. Thus, the burden on the user can be reduced, and the image-quality adjusting parameter can be appropriately managed. In FIG. 4, in a case when the processes in steps S404 and S406 are not executed, and the reproducing process is determined to be in execution, the process may be allowed to proceed from steps S403 to S405.

In the present embodiment, the example has been described in which the state information is used to detect the start of the recording process, the start of the reproducing process, the various parameter changing operations, and the like. However, the detection method is not limited to this. For example, a recording start signal may be output from the recording and reproducing apparatus at the start of the recording process, so that the start of the recording process can be detected by detecting the recording start signal. The recording start signal may be output from the recording and reproducing apparatus at the start of the recording process, and a recording end signal may be output from the recording and reproducing apparatus at the end of the recording process. Then, the parameter changing operation performed between the detection of the recording start signal and the detection of the recording end signal may be detected as the "parameter changing operation performed during the execution of the recording process". A similar method may be applied to detections related to the reproducing process and the pausing process.

Figure 1B:
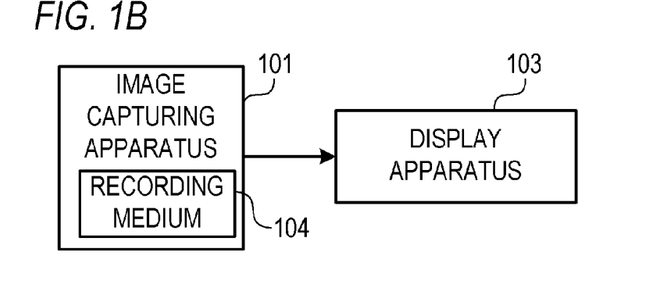

FIG. 1A illustrates the configuration in which the image capturing apparatus 101 is connected indirectly to the display apparatus 103, via the recording and reproducing apparatus 102 (indirect connection). As depicted in FIG. 1B, however, in a case when the image capturing apparatus 101 incorporates the functions of the recording and reproducing apparatus 102, an output terminal of the image capturing apparatus 101, and an input terminal of the display apparatus 103 may be directly connected together. In this case, the image capturing apparatus 101 includes a recording medium (memory) 104 in which image data can be recorded. The recording medium (memory) 104 may be an installed hard disk, a portable Compact Flash (CF) memory card, a Secure Digital (SD) memory card, or the like.

Figure 1C:
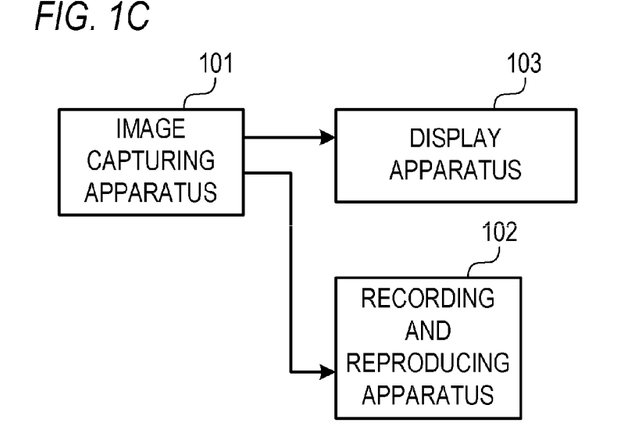

As depicted in FIG. 1C, the image capturing apparatus 101 may connect to the recording and reproducing apparatus 102 and the display apparatus 103. In this case, the output terminal of the image capturing apparatus 101 and the input terminal of the display apparatus 103 may be directly connected together, and the output terminal of the image capturing apparatus 101 and an input terminal of the recording and reproducing apparatus 102 may be directly connected together. The display apparatus 103 is connected indirectly to the recording and reproducing apparatus 102 (indirect connection). The first state information on the recording process may be information indicative of an instruction to start or to end a moving-image recording process, which instruction is given to the recording and reproducing apparatus 102 by the image capturing apparatus 101, or information indicative of an instruction to start or to end a recording process for a moving image in the recording medium (memory) inside of the image capturing apparatus 101. Alternatively, the first state information may be information indicative of an instruction to record the set image-quality adjusting parameter. In this case, in response to input information indicative of an instruction to start the moving-image recording process, which instruction is given to the recording and reproducing apparatus 102 by the image capturing apparatus 101, the recording and reproducing apparatus 102 may output, to the display apparatus 103, information indicative of an instruction to record the image-quality adjusting parameter. The second state information on the reproducing process or the pausing process may be information indicative of an instruction to start or to end a moving-image reproducing process, which instruction is given to the recording and reproducing apparatus 102 by the image capturing apparatus 101 or of an instruction to execute a pause, or information indicative of an instruction to start or to end a moving-image reproducing process of reading image data from the recording medium (memory) inside of the image capturing apparatus 101 and reproducing the image data, or information indicative of a pause.

Embodiment 2

A parameter-recording control apparatus and a control method for the parameter-recording control apparatus according to Embodiment 2 of the present invention will be described below. Configurations and processes different from the corresponding configurations and processes in Embodiment 1 will be described, and configurations and processes similar to the corresponding configurations and processes in Embodiment 1 will not be described.

Figure 6:
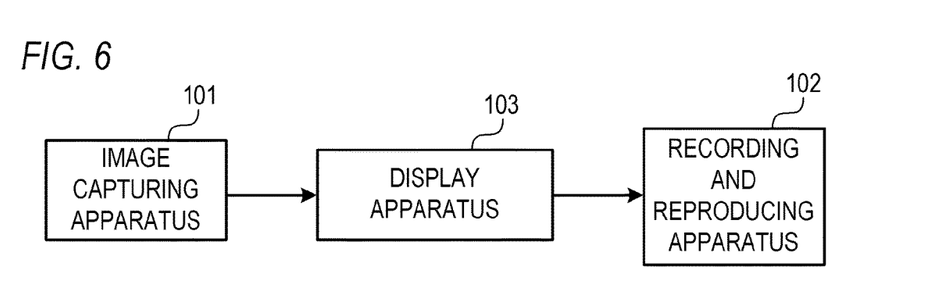
FIG. 6 is a block diagram depicting an example of a configuration of an image-editing system according to Embodiment 2.

FIG. 6 is a block diagram depicting an example of a configuration of an image-editing system according to the present embodiment. As depicted in FIG. 6, the image-editing system according to the present embodiment has an image capturing apparatus 101, a recording and reproducing apparatus 102, and a display apparatus 103. The image capturing apparatus 101 and the display apparatus 103 are connected together using an SDI cable. The recording and reproducing apparatus 102 and the display apparatus 103 are also directly connected together using an SDI cable.

As is the case with Embodiment 1, the display apparatus 103 acquires image data and control data (that is output from the recording and reproducing apparatus 102), executes predetermined image processing on the acquired image data, and displays an image based on the image data with the predetermined image processing executed thereon. However, in the present embodiment, the image data output from the image capturing apparatus 101 may be acquired, or the image data output from the recording and reproducing apparatus 102 may be acquired. In the present embodiment, the display apparatus 103 outputs the image data and an image-quality adjusting parameter to the recording and reproducing apparatus 102.

The recording and reproducing apparatus 102 outputs the control data. The recording and reproducing apparatus 102 records the image data and the image-quality adjusting parameter output from the display apparatus 103 in a storage unit. The recording and reproducing apparatus 102 can output the image data and the image-quality adjusting parameter recorded in the storage unit to the display apparatus 103.

Figure 7:
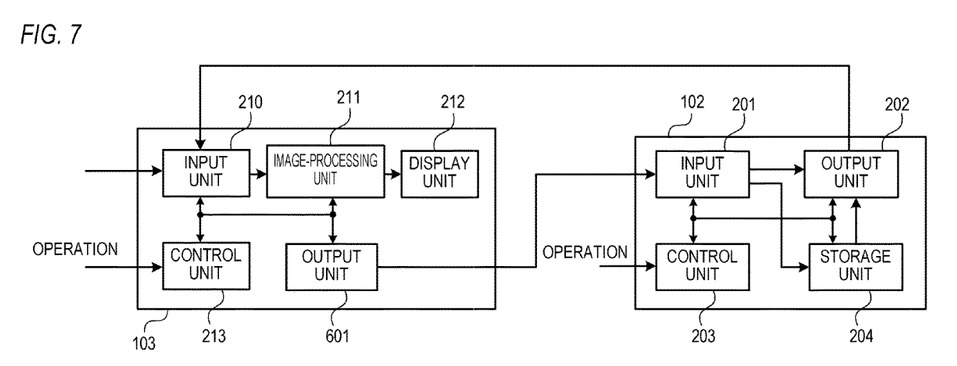
FIG. 7 is a block diagram depicting an example of configurations of a recording and reproducing apparatus, and a display apparatus, according to Embodiment 2.

FIG. 7 is a block diagram depicting an example of configurations of the recording and reproducing apparatus 102 and the display apparatus 103 according to the present embodiment. As depicted in FIG. 7, the recording and reproducing apparatus 102 has an input unit 201, an output unit 202, a control unit 203, and a storage unit 204. The display apparatus 103 has an input unit 210, an image-processing unit 211, a display unit 212, a control unit 213, and an output unit 601.

First, a configuration of the display apparatus 103 will be described.

The input unit 210 acquires the control data output from the recording and reproducing apparatus 102, and outputs the acquired control data to the control unit 213. In a case when the control unit 213 determines that a recording process is in execution, the input unit 210 acquires the image data output from the image capturing apparatus 101 (image data to be recorded), and outputs the acquired image data to the image-processing unit 211 and the output unit 601. In a case when the control unit 213 determines that a reproducing process is in execution, the input unit 210 acquires the image data output from the recording and reproducing apparatus 102 (image data to be reproduced; reproduced image data), and outputs the acquired image data to the image-processing unit 211. In a case when the reproducing process is determined to be in execution, the input unit 210 acquires the image-quality adjusting parameter output from the recording and reproducing apparatus 102 (the image-quality adjusting parameter corresponding to the image data to be reproduced), and outputs the acquired image-quality adjusting parameter to the control unit 213.

In a case when the control unit 213 determines that the recording process is in execution, the output unit 601 acquires the image data output from the input unit 201, and outputs the acquired image data to the recording and reproducing apparatus 102. The output unit 601 outputs the image-quality adjusting parameter output from the control unit 213 by a parameter recording process, to the recording and reproducing apparatus 102. The image data and the image-quality adjusting parameter output from the output unit 601 are recorded in the recording and reproducing apparatus 102.

The control unit 213 executes a parameter setting process, a detection process, a parameter recording process, and the like, based on the control data output from the input unit 210, a user operation performed on the display apparatus 103, and the like. In the present embodiment, the parameter recording process is a process of recording the image-quality adjusting parameter in the recording and reproducing apparatus 102 via the output unit 601. The image-quality adjusting parameter set by the parameter setting process and the image-quality adjusting parameter recorded by the parameter recording process are the same as the image-quality adjusting parameter in Embodiment 1. For example, in a case when the reproducing process is determined to have been started, the image-quality adjusting parameter corresponding to the image data to be reproduced is automatically acquired and set. In the present embodiment, the image-quality adjusting parameter corresponding to the image data to be reproduced is acquired from the recording and reproducing apparatus 102, via the input unit 210.

Now, a configuration of the recording and reproducing apparatus 102 will be described.

In a case when the recording process is in execution, the input unit 201 acquires the image data output from the display apparatus 103, and records the acquired image data in the storage unit 204. The input unit 201 acquires the image-quality adjusting parameter output from the display apparatus 103 by the parameter recording process, and records the acquired image-quality adjusting parameter in the storage unit 204.

The output unit 202 outputs the control data to the display apparatus 103. In a case when the reproducing process is in execution, the image data to be reproduced, and the image-quality adjusting parameter corresponding to the image data to be reproduced, are read from the storage unit 204. The output unit 202 then outputs the read image data and the image-quality adjusting parameter to the display apparatus 103.

Such a configuration can also produce an effect similar to the effect of Embodiment 1 to "allow the image-quality adjusting parameter corresponding to the image data to be automatically appropriately managed (recorded and set) according to the operating state of the recording and reproducing apparatus." According to the present embodiment, the image data and the image-quality adjusting parameter are recorded in the same storage apparatus. This is expected to contribute to a reduction in hardware scale, further enhancement of convenience of the image-editing system, and the like.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display apparatus connected directly or indirectly to an external apparatus that executes a recording process for image data, the display apparatus comprising:
    (a) a display panel that displays an image based on received image data;
    (b) a processor; and
    (c) a memory storing a program which, when executed by the processor, causes the display apparatus:
        (i) to set an image-quality adjusting parameter for the received image data;
        (ii) to execute an image-quality adjusting process on the received image data using the image-quality adjusting parameter that is set for the received image data;
        (iii) to perform control in which, in response to a detection of a start of the recording process for the image data executed by the external apparatus, the image-quality adjusting parameter that has been set for the received image data is automatically recorded in a storage as an image-quality adjusting parameter corresponding to the image data recorded by the external apparatus;
        (iv) to automatically set, in a case when a start of the reproducing process for the image data executed by the external apparatus is detected, the image-quality adjusting parameter recorded in the storage for the received image data as an image-quality adjusting parameter corresponding to the image data reproduced by the external apparatus; and
        (v) to perform control in which, in a case when a user operation of changing the image-quality adjusting parameter for the received image data is detected during execution of the reproducing process for the image data by the external apparatus, the image-quality adjusting parameter changed in accordance with the user operation is automatically recorded in the storage as the image-quality adjusting parameter corresponding to the image data reproduced by the external apparatus.

2. The display apparatus according to claim 1, wherein the display apparatus performs control in which, in a case when a user operation of changing the image-quality adjusting parameter for the received image data is detected during execution of the recording process for the image data by the external apparatus, the image-quality adjusting parameter changed in accordance with the user operation is automatically recorded in the storage as the image-quality adjusting parameter corresponding to the image data recorded by the external apparatus.

3. The display apparatus according to claim 1, wherein the display apparatus acquires first state information indicative of an operating state of the external apparatus to perform detection related to the recording process for the image data executed by the external apparatus.

4. The display apparatus according to claim 1, wherein the display apparatus acquires information indicative of an instruction to start the recording process for the image data in the external apparatus to detect the start of the recording process for the image data executed by the external apparatus.

5. The display apparatus according to claim 1, wherein the reproducing process is a process of sequentially reproducing frames in moving-image data recorded by the recording process, and
the display apparatus performs control in which, in a case when a user operation of changing the image-quality adjusting parameter set for the received image data is detected, the operation being performed during a first period when the reproducing process by the external apparatus is in execution but a pausing process of not updating a frame to be reproduced is not in execution, the image-quality adjusting parameter changed in accordance with the user operation is automatically recorded in the storage as the image-quality adjusting parameter corresponding to all frames in the moving-image data to be reproduced.

6. The display apparatus according to claim 1, wherein the reproducing process is a process of sequentially reproducing frames in moving-image data recorded by the recording process, and
the display apparatus performs control in which, in a case when a user operation of changing the image-quality adjusting parameter set for the received image data is detected, the operation being performed during a second period when the reproducing process by the external apparatus is in execution and a pausing process of not updating a frame to be reproduced is also in execution, the image-quality adjusting parameter changed in accordance with the user operation is automatically recorded in the storage as an image-quality adjusting parameter corresponding, among a plurality of frames in the moving-image data to be reproduced, to the frames that follow the frame to be reproduced.

7. The display apparatus according to claim 1, wherein the image data is moving-image data, and the display apparatus performs control in which an image-quality adjusting parameter corresponding to a certain part of frames in the moving-image data is recorded in association with corresponding information indicative of the certain part of frames.

8. The display apparatus according to claim 7, wherein the corresponding information indicative of the certain part of frames in the moving-image data includes time codes for the certain part of frames.

9. The display apparatus according to claim 1, wherein the image data is moving-image data, and the display apparatus performs control in which an image-quality adjusting parameter changed in accordance with a user operation is automatically recorded in the storage as an image-quality adjusting parameter corresponding to all frames in the moving-image data recorded by the external apparatus.

10. The display apparatus according to claim 1, wherein the display apparatus acquires second state information indicative of an operating state of the external apparatus to perform detection related to the reproducing process for the image data executed by the external apparatus.

11. The display apparatus according to claim 1, wherein the display apparatus performs control in which the image-quality adjusting parameter is recorded in association with corresponding information indicative of the image data corresponding to the image-quality adjusting parameter.

12. The display apparatus according to claim 11, wherein the corresponding information indicative of the image data includes a data name of the image data.

13. The display apparatus according to claim 11, wherein the display apparatus describes the corresponding information indicative of the image data corresponding to the image-quality adjusting parameter, in at least one of a tag and a file name of a data file for the image-quality adjusting parameter.

14. The display apparatus according to claim 11, wherein the display apparatus describes the corresponding information indicative of the image data corresponding to the image-quality adjusting parameter, in a tag and a file name of a data file for the image-quality adjusting parameter, in a divided manner.

15. A control method for a display apparatus connected directly or indirectly to an external apparatus that executes a recording process for image data, the control method comprising:
setting an image-quality adjusting parameter for received image data;
executing an image-quality adjusting process on the received image data using the image-quality adjusting parameter that is set for the received image data;
performing control in which, in response to a detection of a start of the recording process for the image data executed by the external apparatus, the image-quality adjusting parameter that has been set for the received image data is automatically recorded in a storage as an image-quality adjusting parameter corresponding to the image data recorded by the external apparatus;
automatically setting, in a case when a start of the reproducing process for the image data executed by the external apparatus is detected, the image-quality adjusting parameter recorded in the storage for the received image data as an image-quality adjusting parameter corresponding to the image data reproduced by the external apparatus; and
performing control in which, in a case when a user operation of changing the image-quality adjusting parameter for the received image data is detected during execution of the reproducing process for the image data by the external apparatus, the image-quality adjusting parameter changed in accordance with the user operation is automatically recorded in the storage as the image-quality adjusting parameter corresponding to the image data reproduced by the external apparatus.

16. A non-transitory computer readable medium that stores a program, wherein the program causes a computer to execute a control method for a display apparatus connected directly or indirectly to an external apparatus that executes a recording process for image data, and the control method includes:

setting an image-quality adjusting parameter for received image data;

executing an image-quality adjusting process on the received image data using a set image-quality adjusting parameter that is set for the received image data;

performing control in which, in response to a detection of a start of the recording process for the image data executed by the external apparatus, the image-quality adjusting parameter that has been set for the received image data is automatically recorded in a storage as an image-quality adjusting parameter corresponding to the image data recorded by the external apparatus;

automatically setting, in a case when a start of the reproducing process for the image data executed by the external apparatus is detected, the image-quality adjusting parameter recorded in the storage for the received image data as an image-quality adjusting parameter corresponding to the image data reproduced by the external apparatus; and performing control in which, in a case when a user operation of changing the image-quality adjusting parameter for the received image data is detected during execution of the reproducing process for the image data by the external apparatus, the image-quality adjusting parameter changed in accordance with the user operation is automatically recorded in the storage as the image-quality adjusting parameter corresponding to the image data reproduced by the external apparatus.

* * * * *